United States Patent
Ren et al.

(10) Patent No.: US 12,381,811 B2
(45) Date of Patent: Aug. 5, 2025

(54) METHOD FOR ENERGY EFFICIENT ROUTING IN WIRELESS SENSOR NETWORK BASED ON MULTI-AGENT DEEP REINFORCEMENT LEARNING

(71) Applicant: UNIVERSITY OF ELECTRONIC SCIENCE AND TECHNOLOGY OF CHINA, Sichuan (CN)

(72) Inventors: Jing Ren, Chengdu (CN); Tongyu Song, Chengdu (CN); Jiangong Zheng, Chengdu (CN); Xiaotong Guo, Chengdu (CN); Xuebin Tan, Chengdu (CN); Sheng Wang, Chengdu (CN); Shizhong Xu, Chengdu (CN); Xiong Wang, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 361 days.

(21) Appl. No.: 18/125,881

(22) Filed: Mar. 24, 2023

(65) Prior Publication Data
US 2023/0231796 A1 Jul. 20, 2023

(30) Foreign Application Priority Data
Apr. 12, 2022 (CN) .......................... 202210378218.5

(51) Int. Cl.
*H04L 45/02* (2022.01)
*H04W 40/10* (2009.01)
*H04W 40/24* (2009.01)

(52) U.S. Cl.
CPC ............. *H04L 45/08* (2013.01); *H04W 40/10* (2013.01); *H04W 40/24* (2013.01)

(58) Field of Classification Search
CPC ........ H04L 45/08; H04W 40/10; H04W 40/24
See application file for complete search history.

(56) References Cited

U.S. PATENT DOCUMENTS 8,737,226 B2 * 5/2014 Liang .................... H04W 84/18
370/235
9,357,472 B2 5/2016 Mukherjee
(Continued)

*Primary Examiner* — Chandrahas B Patel
(74) *Attorney, Agent, or Firm* — Oliff PLC

(57) ABSTRACT

A method for energy efficient routing in wireless sensor network based on multi-agent deep reinforcement learning, predefines a to-be-deployed wireless sensor network and creates a cooperative routing decision system including A decision networks and one sink module, A decision networks deployed on the agents $a^i$, i=1, 2, . . . , A, of the sensor nodes, the sink module deployed on the sink node $n^0$. The decision network obtains a probability vector according to its local observation and position vectors. The sink module calculates a routing for each sensor node according the probability vectors of A decision networks and sends the routings to corresponding sensor nodes. A multi-agent deep reinforcement learning algorithm is adopted to train the decision networks of A agents $a^i$, i=1, 2, . . . , A of the cooperative routing decision system, deploys the to-be-deployed wireless sensor network into an environment and updates the routing policy of the deployed wireless sensor network at each update cycle of routing.

4 Claims, 6 Drawing Sheets

(56) References Cited

U.S. PATENT DOCUMENTS

| | | |
|---|---|---|
| 9,560,591 B2 | 1/2017 | Xu et al. |
| 2006/0178156 A1* | 8/2006 | Kim .................... H04W 40/24 |
| | | 455/466 |
| 2009/0296704 A1* | 12/2009 | Kim ...................... H04L 45/48 |
| | | 370/389 |
| 2010/0054183 A1* | 3/2010 | Shin .................... H04L 45/122 |
| | | 370/328 |

* cited by examiner

METHOD FOR ENERGY EFFICIENT ROUTING IN WIRELESS SENSOR NETWORK BASED ON MULTI-AGENT DEEP REINFORCEMENT LEARNING

FIELD OF THE INVENTION

This application claims priority under the Paris Convention to Chinese Patent Application No. 202210378218.5, filed on Apr. 12, 2022, the entirety of which is hereby incorporated by reference for all purposes as if fully set forth herein.

The present invention relates to the field of communication technology, more particularly to a method for energy efficient routing in wireless sensor network (WSN) based on multi-agent deep reinforcement learning.

BACKGROUND OF THE INVENTION

Wireless sensor networks (WSNs) enable many sensor nodes to collaboratively collect sensing data from the environment. The sensor nodes forward the sensing data collected locally or received from other nodes to the sink node of WSNs through multi-hop paths. With the development of $5^{th}$ generation (5G) wireless systems, WSNs have been widely applied for various applications, e.g., traffic management, environment monitoring, smart family, and military. The energy of battery-powered sensor nodes is a vital resource for WSNs as these sensors are usually deployed in hard-to-reach places and are difficult to recharge. Battery energy depletion of sensor nodes can result in network partitioning and reduce the network lifetime. Thus, energy efficiency is critical for WSNs.

A typical sensor node is composed of sensing module, processing module, communication module and power-supply module. Sensor module is responsible for collecting the environmental data; processing module is responsible for processing the environmental data collected by sensor module; communication module is responsible for exchanging data and communicating with other sensor nodes and the sink node of the wireless sensor network; power-supply module generally is a battery or batteries.

The energy consumption of a wireless sensor network is mainly related to the initializing of deployment, information sensing, data forwarding, the communication of control signals among sensor nodes, hardware driving and logging. Studies have shown that the energy consumption in data forwarding accounts for 80% of the total energy consumption of a sensor node.

Data forwarding stage mainly relates to data receiving, data processing (data fusion), routing and data sending. Among of them, the energy efficiency of data receiving and sending has been improved to a great extent under the circumstance that the adaptive transmission power control technique is applied; the energy consumption of data processing is generally related to specific application data, which can be regarded as a black box; routing is how to choose the most effective forwarding path to send the collected environmental data to the sink node.

For routing, if the forwarding path is not correctly chosen, the collected environmental data will be forwarded excessively, which makes the energy consumption of a sensor node increased dramatically; and when the residual energies of sensor nodes are uneven, the routing policy should use the sensor nodes with more residual energy to relay, for the reason that when the energy of a sensor node are depleted, other sensor nodes cannot forward collected environmental data through it, and when the number of the energy depleted sensor nodes reaches a certain number, the connectivity of the wireless sensor network will be broken, which can lead to paralysis of the entire wireless sensor network.

SUMMARY OF THE INVENTION

The present invention aims to overcome the deficiencies of the prior art, and provides a method for energy efficient routing in wireless sensor network based on multi-agent deep reinforcement learning, which dynamically adjusts the routing policy of the wireless sensor network according to the changes of residual energies of sensor nodes and routing hops, so as to maximize the lifetime of the wireless sensor network.

To achieve these objectives, in accordance with the present invention, a method for energy efficient routing in wireless sensor network based on multi-agent deep reinforcement learning is provided, comprising:

step S1: for a wireless sensor network to be deployed, denoting the sink node which is connected to power supplies and has unlimited energy by $n^0$ and the sensor nodes which are battery-powered by $n^i$, $i=1, 2, \ldots, A$, where A is the number of the battery-powered sensor nodes; and for sensor node $n^i$, taking the other nodes within its communication range as its neighbor node set $N_{nbr}^i$;

setting the transmission cycle of each sensor node as U seconds, wherein each sensor node collects environmental data T seconds from its environment in each transmission cycle and sends the collected environmental data to sink node $n^0$;

deploying an agent on each sensor node, wherein for sensor node $n^i$, its agent is denoted by $a^i$;

step S2: constructing a cooperative routing decision system, which comprises A decision networks and one sink module, where A decision networks are deployed on agents $a^i$, $i=1, 2, \ldots, A$, of sensor nodes $n^i$, $i=1, 2, \ldots, A$, respectively, and the sink module is deployed on sink node $n^0$, wherein:

the decision network deployed on agent $a^i$ of sensor node $n^i$ is used for determining a probability vector $P_t^i[p_t^{i,0}, p_t^{i,1}, \ldots, p_t^{i,A}]$ of choosing sink node $n^0$ and sensor nodes $n^i$, $i=1, 2, \ldots, A$ as its parent nodes at time t, where $p_t^{i,j}$ is a probability of choosing node $n^i$ as the parent node of sensor node $n^i$ at time t, $j=0, 1, \ldots, A$, t is a routing decision time, probability vector $P_t^i=[p_t^{i,0}, p_t^{i,1}, \ldots, p_t^{i,A}]$ s uploaded to the sink module on sink node $n^0$ through the current routing;

the decision network comprises a neural network and a mask module, where the input of the neural network is an input vector which is obtained by concatenating a local observation vector $O_t^i$ and a position vector $Pos^i$, the output of the neural network is denoted by a raw probability vector $\hat{P}_t^i[\hat{p}_t^{i,0}, \hat{p}_t^{i,1}, \ldots, \hat{p}_t^{i,A}]$ and sent to the mask module, $\hat{p}_t^{i,j}$ is a raw probability of choosing node $n^j$ as the parent node of sensor node $n^i$ at time t, where:

local observation vector $O_t^i$ is determined as follows: firstly, obtaining data amounts $c_s^{i,t-b_1+1}$, $b_1=1, 2, \ldots, B_1$ of the environmental data collected by sensor node $n^i$ at previous $B_1$ routing decision times, obtaining data amounts $c_o^{i,t-b_2+1}$, $b_2=1, 2, \ldots, B_2$ of the data forwarded by sensor node $n^i$ as a relay node at previous $B_2$ routing decision times and obtaining residual energy $W^{i,t}$ of sensor node $n^i$ at time t, then normalizing data amount $c_s^{i,t-b_1+1}$, data amount $c_o^{i,t-b_2+1}$ and residual energy $W^{i,t}$ according to their respective theoretical maximum to obtain a normalized data amount $\bar{c}_s^{i,t-b_1+1}$, a normalized data amount $\bar{c}_o^{i,t-b_2+1}$ and a normalized residual energy $\overline{W}^{i,t}$:

$$\bar{c}_s^{i,t-b_1+1} = \frac{2c_s^{i,t-b_1+1}}{\hat{c}_s^i} - 1, b_1 = 1, 2, \ldots, B_1$$

$$\bar{c}_o^{i,t-b_2+1} = \frac{2c_o^{i,t-b_2+1}}{\hat{c}_o^i} - 1, b_2 = 1, 2, \ldots, B_2$$

$$\overline{W}^{i,t} = \frac{2W^{i,t}}{\hat{W}^i} - 1$$

where $\hat{c}_s^i$, $\hat{c}_o^i$ and $\hat{W}^i$ are the theoretical maximums of data amount $c_s^{i,t-b_1+1}$, data amount $c_o^{i,t-b_2+1}$ and residual energy $W^{i,t}$, respectively;

then concatenating normalized data amount $\bar{c}_s^{i,t-b_1+1}$, normalized data amount $c_o^{i,t-b_2+1}$ and normalized residual energy $\overline{W}^{i,t}$ to obtain a local observation vector $O_t^i$:

$$O^i = [\bar{c}_s^{i,t-B_1+1}, \ldots, \bar{c}_s^{i,t}, \bar{c}_o^{i,t-B_2+1}, \ldots, \bar{c}_o^{i,t}, \overline{W}^{i,t}]$$

position vector $Pos^i$ is determined as follows: establishing a Cartesian coordinate system with sink node $n^0$ as an origin and obtaining coordinates $(pos_1^i, pos_2^i)$ of sensor node $n^i$ under the Cartesian coordinate system, where $pos_1^i$ and $pos_2^i$ are the horizontal coordinate and the vertical coordinate of sensor node $n^i$, respectively, then obtaining a distance $dis^i$ between sensor node $n^i$ and sink node $n^0$ and a maximal distance max_dis among the A distances $dis^i$, i=1, 2, . . . , A, then normalizing coordinates $(pos_1^i, pos_2^i)$ to obtain position vector $Pos^i$:

$Pos^i = (pos_1^i/\text{max\_dis}, pos_2^i/\text{max\_dis})$ the mask module is used for correcting raw probability vector $\hat{P}_t^i = [\hat{p}_t^{i,0}, \hat{p}_t^{i,1}, \ldots, \hat{p}_t^{i,A}]$ according to neighbor node set $N_{nbr}^i$ of sensor node $n^i$ to obtain probability vector $P_t^i = [p_t^{i,0}, p_t^{i,1}, \ldots, p_t^{i,A}]$ as follows: for each probability $\hat{p}_t^{i,j}$ in raw probability vector $\hat{P}_t^i = [\hat{p}_t^{i,0}, \hat{p}_t^{i,1}, \ldots, \hat{p}_t^{i,A}]$, firstly, if the corresponding node $n^i$ is not in neighbor node set $N_{nbr}^i$ of sensor node $n^i$, setting probability $\hat{p}_t^{i,j}$ to 0, otherwise, not changing probability $\hat{p}_t^{i,j}$, then normalizing probability $\hat{p}_t^{i,j}$ to obtain probability $p_t^{i,j}$:

$$p_t^{i,j} = \frac{\hat{p}_t^{i,j}}{\sum_{j'=0}^{A} \hat{p}_t^{i,j'}}$$

the sink module is used for making a routing decision according to probability vectors $P_t^i = [p_t^{i,0}, p_t^{i,1}, \ldots, p_t^{i,A}]$, i=1, 2, . . . , A uploaded to the sink module by A decision networks as follows: firstly, generating a spanning tree of the wireless sensor network at time t according to probability vectors $P_t^i = [p_t^{i,0}, p_t^{i,1}, \ldots, p_t^{i,A}]$, i=1, 2, . . . , A, then taking sink node $n^0$ as a root node to recalculate a routing for each sensor node according to the spanning tree;

step S3: training the decision networks of A agents $a^i$, i=1, 2, . . . , A of the cooperative routing decision system by a multi-agent deep reinforcement learning algorithm;

step S4: deploying the wireless sensor network, which comprises the following steps:

step S4.1: firstly, calculating a minimum spanning tree according to the positions and the neighborhoods of sensor nodes $n^i$, 1=1, 2, . . . , A of the wireless sensor network to be deployed by taking the distances between nodes as weights, then, taking sink node $n^0$ in the minimum spanning tree as a root node and calculating an initial routing for each sensor node;

step S4.2: for each sensor node, loading the information of its neighborhood and initial routing into its configuration file according to its position;

step S4.3: loading the positions of sensor nodes $n^i$, i=1, 2, . . . , A into sink node $n^0$;

step S4.4: deploying sensor nodes $n^i$, i=1, 2, . . . , A into an actual environment according to their respective positions;

step S5: when the wireless sensor network is started, setting up two counters in each sensor node and initializing the two counters to 0, wherein the two counters are used for counting the amount $cnt_s^i$ of the collected environmental data and the amount $cnt_o^i$ of the forwarded data at each decision, initializing a transmission count m in each sensor node to 1;

step S6: for each sensor node, collecting environmental data from environment continuously and receiving the environmental data sent by other sensor nodes, sending the environmental data collected in current transmission cycle and forwarding the environmental data coming from other sensor nodes to the sink node according to current routing at each transmission interval of U seconds, where the amount of the environmental data collected by sensor node $n^i$ and sent to the parent node of sensor node $n^i$ at the $m^{th}$ transmission circle is denoted by the amount of the environmental data coming from other sensor nodes and forwarded by the sensor node $n^i$ at the $m^{th}$ transmission circle is denoted by $d_o^{i,m}$, then amount $cnt_s^i$ of the collected environmental data is $cnt_s^i = cnt_s^i + d_s^{i,m}$ and amount $cnt_o^i$ of the forwarded data is $cnt_o^i = cnt_o^i + d_o^{i,m}$;

step S7: obtaining the residual energies of the sensor nodes and judging whether one of them is below a pre-defined threshold, if yes, then judging that the wireless sensor network is paralyzed and terminating the routing process, otherwise going to step S8;

step S8: judging whether m % M=0, where M is a routing decision cycle, which is denoted by the number of transmission cycles, % is a remainder operator, if yes, then going to step S9, otherwise returning to step S6;

step S9: updating the routing policy of the wireless sensor network through a cooperative routing decision of A agents $a^i$, 1=1, 2, . . . , A, which comprises the following steps:

step S9.1: obtaining amount $cnt_s^i$ of the collected environmental data and the amount $cnt_o^i$ of the forwarded data of the corresponding sensor node $n^i$ by agent $a^i$, letting data amount $c_s^{i,t} = cnt_s^i$ and data amount $c_o^i = cnt_o^i$, then setting amount $cnt_s^i$ of the collected environmental data and amount $cnt_o^i$ of the forwarded data to 0, where i=1, 2, . . . , A;

step S9.2: obtaining local observation vector $O_t^i$ and position vector $Pos^i$ of sensor node $n^i$ by agent $a^i$, then concatenating local observation vector $O_t^i$ and position vector $Pos^i$ together to obtain an input vector and inputting the input vector to corresponding decision network to obtain a probability vector $P_t^i = [p_t^{i,0}, p_t^{i,1}, \ldots, p_t^{i,A}]$, where i=1, 2, . . . , A;

step S9.3: uploading probability vectors $P_t^i = [p_t^{i,0}, p_t^{i,1}, \ldots, p_t^{i,A}]$, i=1, 2, . . . , A to sink node $n^0$ by sensors nodes $n^i$ through their corresponding current routings, respectively;

step S9.4 recalculating a routing for each sensor node by sink node $n^0$ according to the received probability vectors $P_t^i=[p_t^{i,0}, p_t^{i,1}, \ldots, p_t^{i,A}]$, $i=1, 2, \ldots, A$ and sending the routings to corresponding sensor nodes, respectively, then returning to step S6.

The objectives of the present invention are realized as follows:

The present invention provides a method for energy efficient routing in wireless sensor network (WSN) based on multi-agent deep reinforcement learning, which firstly predefines a to-be-deployed wireless sensor network and creates a cooperative routing decision system, where cooperative routing decision system comprises A decision networks and one sink module, A decision networks are deployed on agents $a^i$, $i=1, 2, \ldots, A$, of the sensor nodes, respectively, and the sink module is deployed on sink node $n^0$, the decision network obtains a probability vector according to its local observation vector and position vector; then the sink module calculates a routing for each sensor node according the probability vectors of A decision networks and sends the routings to corresponding sensor nodes, respectively, a multi-agent deep reinforcement learning algorithm is adopted to train the decision networks of A agents of the cooperative routing decision system, then deploys the to-be-deployed wireless sensor network into an actual environment and updates the routing policy of the deployed wireless sensor network at each routing decision cycle through the cooperative routing decision system. In the present invention, the hops and residual energies of the sensor nodes are taken into consideration and the routing policy of the wireless sensor network is adjusted (updated) according to the change of residual energies of sensor nodes, so maximization of the lifetime of the wireless sensor network is realized.

Meanwhile, the present invention has the following advantageous features:

(1) The present invention has realized a joint routing decision of a wireless sensor network. Comparing to traditional routing algorithm, it has the advantage of multi-sensor cooperation;
(2) The present invention can avoid the transmission of extra control signal between sensors, so that the energy consumption is reduced;
(3) The present invention has devised a routing method for the whole process from the deployment to the paralysis of the wireless sensor network. The routing policy of the wireless sensor network can be adjusted (updated) according to the change of residual energies of sensor nodes, which can maximize the lifetime of the wireless sensor network;
(4) The present invention has adopted a multi-agent deep reinforcement learning algorithm for routing decision. Comparing to the method of devising heuristic evaluation criterion and greedily choosing transmission routings in traditional routing algorithm, it can be more accurate to choose an appropriate routing for each sensor node.
(5) The present invention is based on a multi-agent deep reinforcement learning algorithm, and takes the influence of the global state of the wireless sensor network into consideration in the process of training the decision networks of A agents. Comparing to the method of only considering the local state in traditional routing algorithm, the present invention chooses a routing policy in consideration of the energy of the whole wireless sensor network, so as to maximize the lifetime of the wireless sensor network.

BRIEF DESCRIPTION OF THE DRAWING

The above and other objectives, features and advantages of the present invention will be more apparent from the following detailed description taken in conjunction with the accompanying drawings, in which.

DETAILED DESCRIPTION OF THE PREFERRED EMBODIMENT

Figure 1:
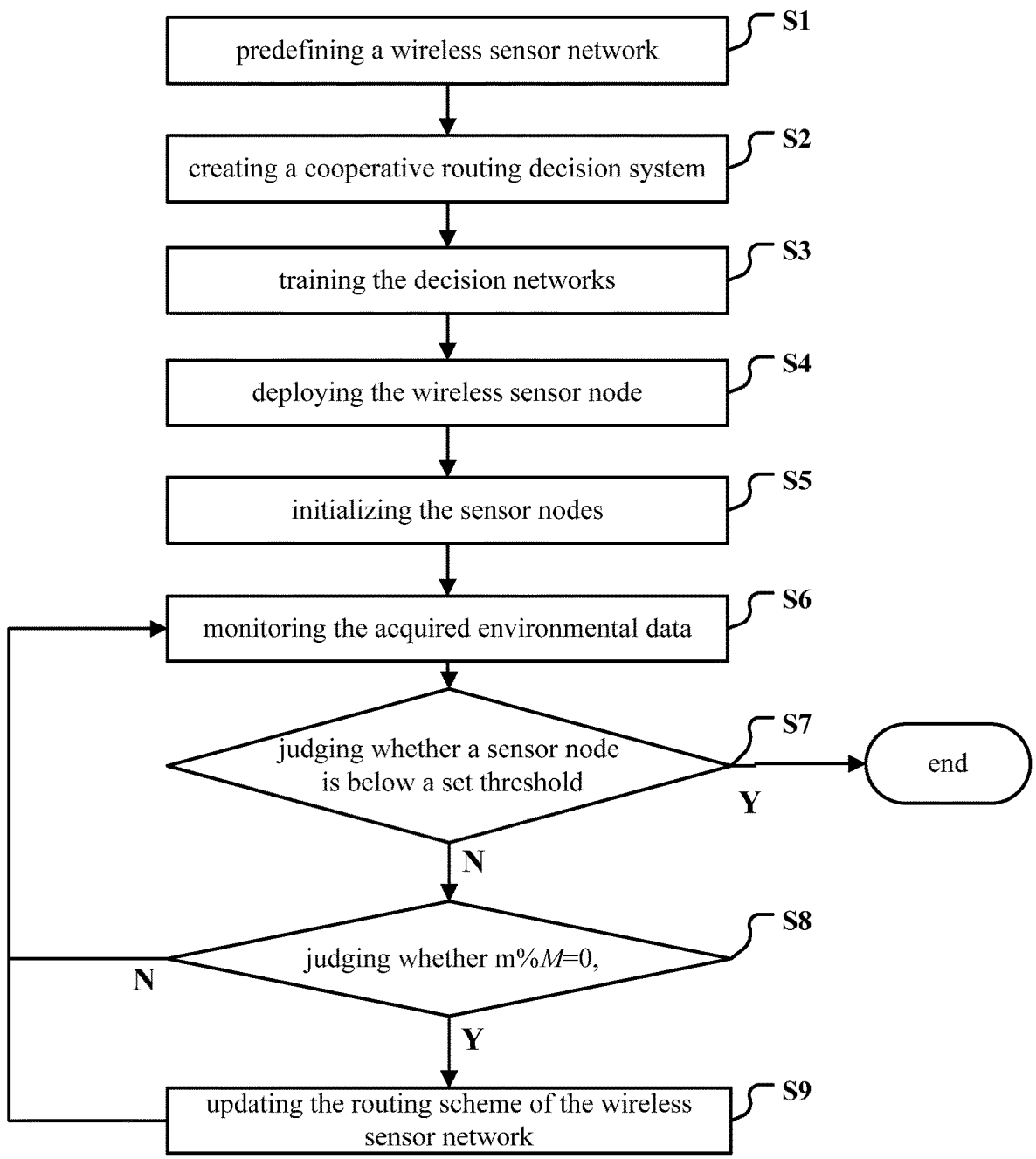
FIG. 1 is a flow diagram of a method for energy efficient routing in wireless sensor network (WSN) based on multi-agent deep reinforcement learning in accordance with the present invention.

Hereinafter, preferred embodiments of the present invention will be described with reference to the accompanying drawings. It should be noted that the similar modules are designated by similar reference numerals although they are illustrated in different drawings. Also, in the following description, a detailed description of known functions and configurations incorporated herein will be omitted when it may obscure the subject matter of the present invention.

FIG. 1 is a flow diagram of a method for energy efficient routing in wireless sensor network (WSN) based on multi-agent deep reinforcement learning in accordance with the present invention. As shown in FIG. 1, a method for energy efficient routing in wireless sensor network (WSN) based on multi-agent deep reinforcement learning is provided, which comprises:

Step S1: Predefining a Wireless Sensor Network

For a wireless sensor network to be deployed, denoting the sink node which is connected to power supplies and has unlimited energy by $n^0$ and the sensor nodes which are battery-powered by $n^i$, $i=1, 2, \ldots, A$, where A is the number of the battery-powered sensor nodes; and for sensor node $n^i$, taking the other nodes within its communication range as its neighbor node set $N_{nbr}^i$.

Setting the transmission cycle of each sensor node as U seconds, wherein each sensor node collects environmental data T seconds from its environment in each transmission cycle and sends the collected environmental data to sink node $n^0$. The transmission cycle and time length of collecting environmental data should satisfy that each sensor node has enough time to complete its data transmission.

Deploying an agent on each sensor node, wherein for sensor node $n^i$, its agent is denoted by $a^i$. The agent is used for deploying a decision network, so as a periodic routing decision can cooperatively be made to obtain the routing of each sensor node.

Figure 2:
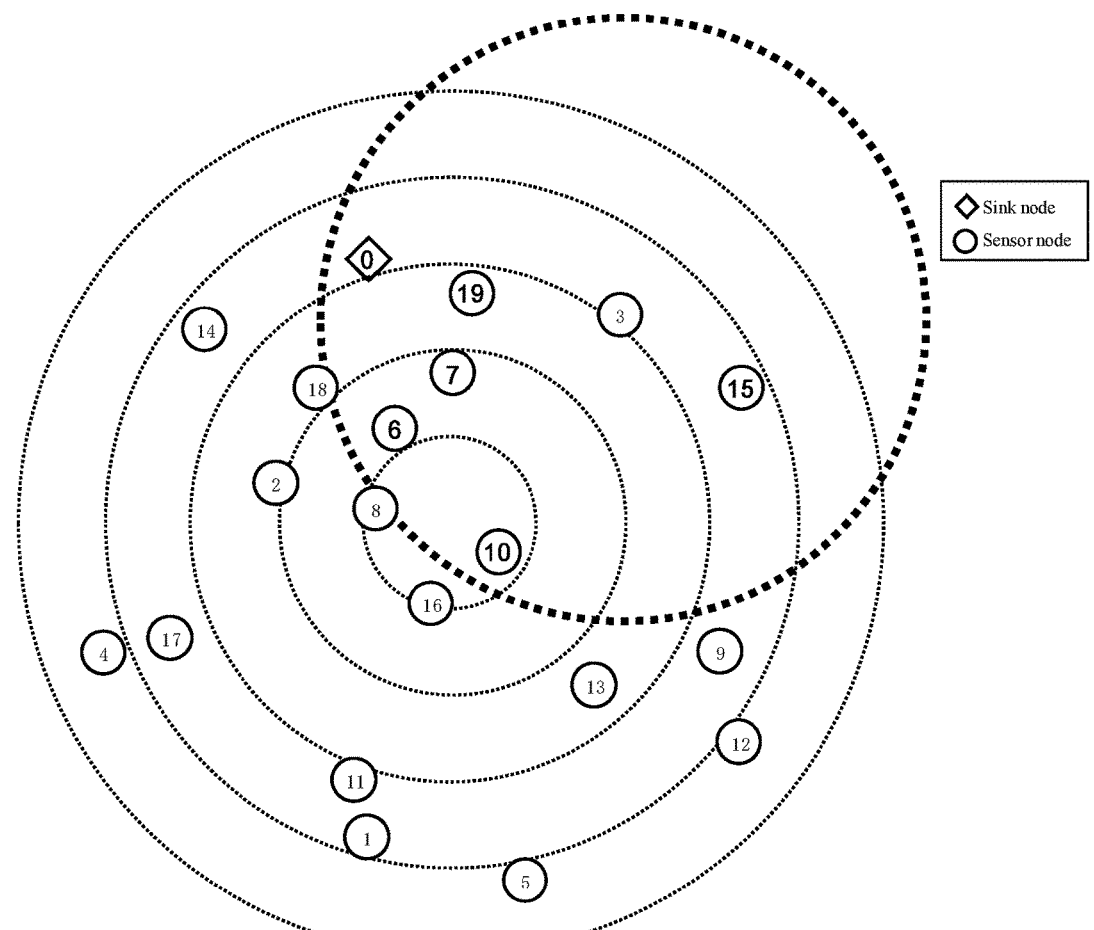
FIG. 2 is a diagram of a predefined wireless sensor network in accordance with one embodiment of the present invention.

FIG. 2 is a diagram of a predefined wireless sensor network in accordance with one embodiment of the present invention. As shown in FIG. 2, a wireless sensor network will be deployed within a 1000-meter radius. The radius of each ring in FIG. 2 is r*200 meters, r=1, 2, . . . , 5. The wireless sensor network has one sink node (numbered as 0) and 19 sensor nodes (numbered as 1-19, namely A=19), the communication range R of each sensor node is 700 meters. Each sensor node takes the other nodes within its communication range as its neighbor node set $N_{nbr}{}^i$. For example, neighbor node set $N_{nbr}{}^3$ of sensor node $n^3$ is $\{n^0, n^6, n^7, n^{10}, n^{15}, n^{19}\}$.

Step S2: Constructing a Cooperative Routing Decision System

The cooperative routing decision system comprises A decision networks and one sink module, where A decision networks are deployed on agents $a^i$, $l=1, 2, \ldots, A$, of sensor nodes $n^i$, $i=1, 2, \ldots, A$, respectively, and the sink module is deployed on sink node $n^0$. The decision network and the sink module are detailed as follows:

The decision network deployed on agent $a^i$ of sensor node $n^i$ is used for determining a probability vector $P_t^i=[p_t^{i,0}, p_t^{i,1}, \ldots, p_t^{i,A}]$ of choosing sink node $n^0$ and sensor nodes $n^i$, $i=1, 2, \ldots, A$ as its parent nodes at time t, where $p_t^{i,j}$ is a probability of choosing node $n^j$ as the parent node of sensor node $n^i$ at time t, $j=0,1, \ldots, A$, t is a routing decision time, probability vector $P_t^i=[p_t^{i,0}, p_t^{i,1}, \ldots, p_t^{i,A}]$ is uploaded to the sink module on sink node $n^0$ through the current routing.

Figure 3:
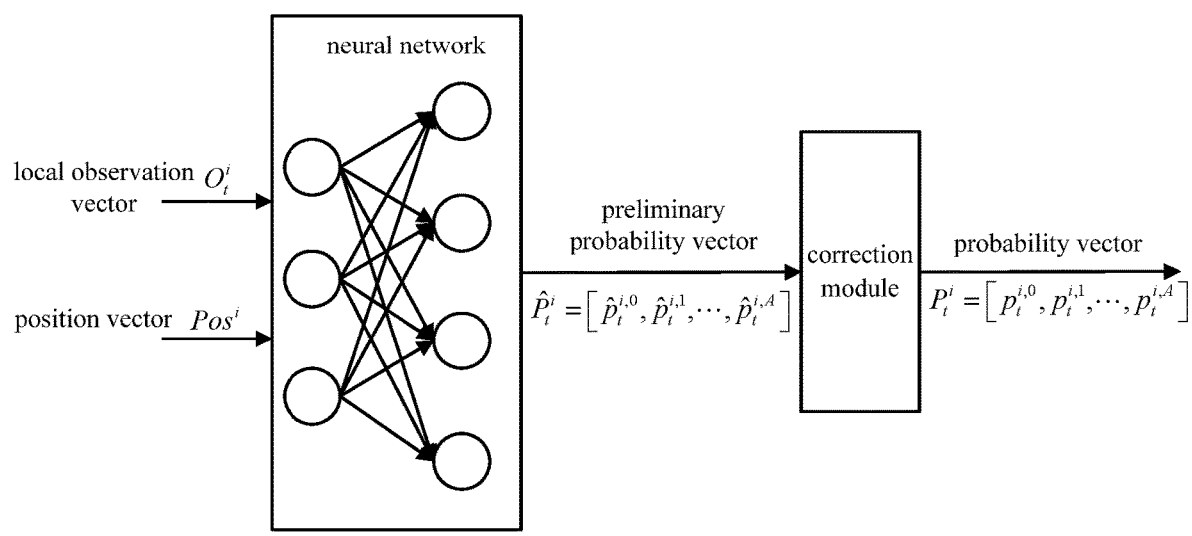
FIG. 3 is a diagram of a decision network in accordance with the present invention.

FIG. 3 is a diagram of a decision network in accordance with the present invention. As shown in FIG. 3, the decision network comprises a neural network and a correction module, where the input of the neural network is an input vector which is obtained by concatenating a local observation vector $O_t^i$ and a position vector $Pos^i$, the output of the neural network is denoted by a raw probability vector $\hat{P}_t^i=[\hat{p}_t^{i,0}, \hat{p}_t^{i,1}, \ldots, \hat{p}_t^{i,A}]$ and sent to the mask module, $\hat{p}_t^{i,j}$ is a raw probability of choosing node $n^j$ as the parent node of sensor node $n^i$ at time t, where:

The local observation vector $O_t^i$ is determined as follows: firstly, obtaining data amounts $c_s^{i,t-b_1+1}$, $b_1=1, 2, \ldots, B_1$ of the environmental data collected by sensor node $n^i$ at previous $B_1$ routing decision times, obtaining data amounts $c_o^{i,t-b_2+1}$, $b_2=1, 2, \ldots, B_2$ of the data forwarded by sensor node $n^i$ as a relay node at previous $B_2$ routing decision times and obtaining residual energy $W^{i,t}$ of sensor node $n^i$ at time t, then normalizing data amount $c_s^{i,t-b_1+1}$, data amount $c_o^{i,t-b_2+1}$ and residual energy $W^{i,t}$ according to their respective theoretical maximum to obtain a normalized data amount $\bar{c}_s^{i,t-b_1+1}$ a normalized data amount $\bar{c}_o^{i,t-b_2+1}$ and a normalized residual energy $\bar{W}^{i,t}$:

$$\bar{c}_s^{i,t-b_1+1} = \frac{2c_s^{i,t-b_1+1}}{\hat{c}_s^i} - 1, b_1 = 1, 2, \ldots, B_1$$

$$\bar{c}_o^{i,t-b_2+1} = \frac{2c_o^{i,t-b_2+1}}{\hat{c}_o^i} - 1, b_2 = 1, 2, \ldots, B_2$$

$$\bar{W}^{i,t} = \frac{2W^{i,t}}{\hat{W}^i} - 1$$

where $\hat{c}_s^i$, $\hat{c}_o^i$ and $\hat{W}^i$ are the theoretical maximums of data amount $c_s^{i,t-b_1+1}$ data amount $c_o^{i,t-b_2+1}$ and residual energy $W^{i,t}$, respectively.

Then concatenating normalized data amount $\bar{c}_s^{i,t-b_1+1}$, normalized data amount $\bar{c}_s^{i,t<b_2+1}$ and normalized residual energy $\bar{W}^{i,t}$ to obtain a local observation vector $O_t^i$:

$$O^i = [\bar{c}_s^{i,t-B_1+1}, \ldots, \bar{c}_s^{i,t}, \bar{c}_o^{i,t-B_2+1}, \ldots, \bar{c}_o^{i,t}, \bar{W}^{i,t}].$$

In the embodiment, $B_1=B_2=5$, then the dimensions of local observation vector $O_t^i$ is 11.

The position vector $Pos^i$ is determined as follows: establishing a Cartesian coordinate system with sink node $n^0$ as an origin and obtaining coordinates $(pos_1{}^i, pos_2{}^i)$ of sensor node $n^i$ under the Cartesian coordinate system, where $pos_1{}^i$ and $pos_2{}^i$ are the horizontal coordinate and the vertical coordinate of sensor node $n^i$, respectively, then obtaining a distance $dis^i$ between sensor node $n^i$ and sink node $n^0$ and a maximal distance max_dis among the A distances $dis^i$, i=1, 2, . . . , A, then normalizing coordinates $(pos_1{}^i, pos_2{}^i)$ to obtain position vector $Pos^i$:

$$Pos^i = (pos_1{}^i/\text{max\_dis}, pos_2{}^i/\text{max\_dis}).$$

Figure 4:
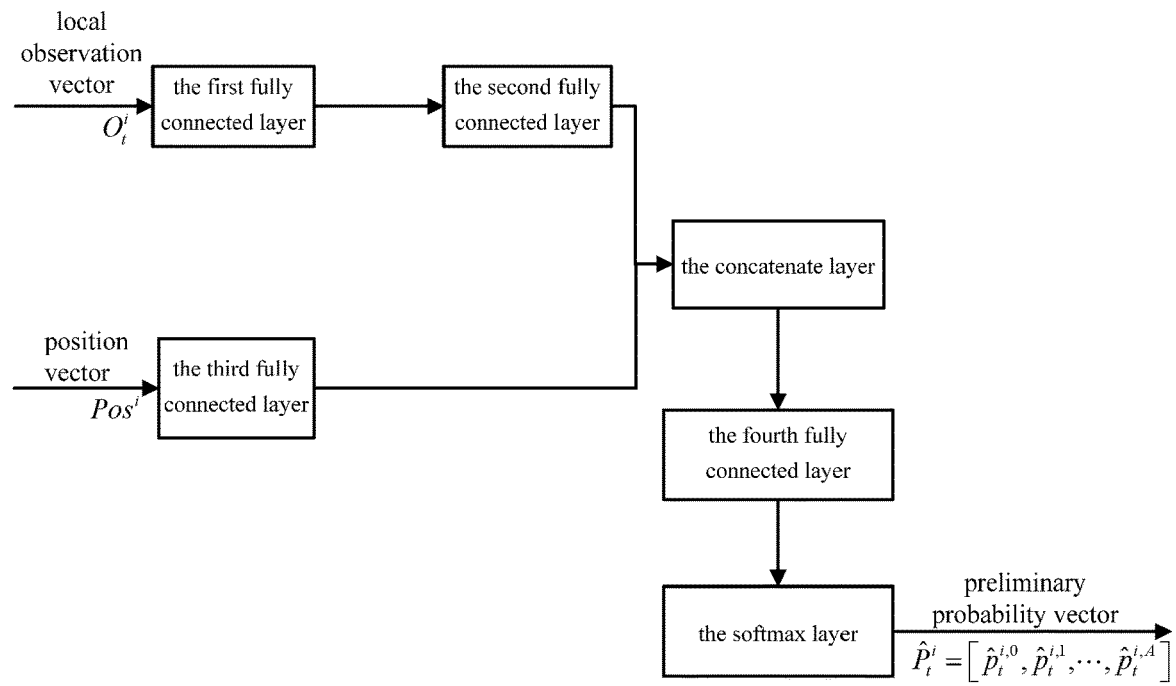
FIG. 4 is a diagram of the neural network shown in FIG. 3.

FIG. 4 is a diagram of the neural network shown in FIG. 3. As shown in FIG. 4, the neural network in the embodiment comprises the first fully connected layer, the second fully connected layer, the third fully connected lay, a concatenate layer, the fourth fully connected layer and a softmax layer, where:

The first fully connected layer is used for receiving and processing local observation vector $O_t^i$ and sending the obtained feature to the second fully connected layer.

The second fully connected layer is used for processing the received feature and sending its obtained feature to the concatenate layer.

The third fully connected layer is used for receiving and processing position vector $Pos^i$ and sending the obtained feature to the concatenate layer.

The concatenate layer is used for concatenating the two obtained features and send the concatenated feature to the fourth fully connected layer.

The fourth fully connected layer is used for receiving and processing the concatenated feature and sending its obtained feature to the softmax layer.

The softmax layer is used for generating raw probability vector $\hat{P}_t^i=[\hat{p}_t^{i,0}, \hat{p}_t^{i,1}, \ldots, \hat{p}_t^{i,A}]$ according to its received feature.

According the description above, the neural network in the embodiment extracts the state of the local observation vector $O_t^i$ through two fully connected layers and extracts the embedded information of identifying an agent from the position vector $Pos^i$. The respective extractions can make the extracted feature more reasonable and enhance the accuracy of the raw probability vector. In the embodiment, all fully connected layers of the neural network adopt ReLU (Rectified Liner Unit) activation functions, their widths are 128.

The mask module is used for correcting raw probability vector $\hat{P}_t^i=[p_t^{i,0}, p_t^{i,1}, \ldots, p_t^{i,A}]$ according to neighbor node set $N_{nbr}{}^i$ of sensor node $n^i$ to obtain probability vector $P_t^i=[p_t^{i,0}, p_t^{i,1}, \ldots, p_t^{i,A}]$ as follows: for each probability $\hat{p}_t^{i,j}$ in raw probability vector $\hat{P}_t^i=[\hat{p}_t^{i,0}, \hat{p}_t^{i,1}, \ldots, \hat{p}_t^{i,A}]$, firstly, if the corresponding node $n^j$ is not in neighbor node set $N_{nbr}{}^i$ of sensor node $n^i$, setting probability $\hat{p}_t^{i,j}$ to 0, otherwise, not changing probability $\hat{p}_t^{i,j}$, then normalizing probability $\hat{p}_t^{i,j}$ to obtain probability $p_t^{i,j}$:

$$p_t^{i,j} = \frac{\hat{p}_t^{i,j}}{\sum_{j'=0}^{A} \hat{p}_t^{i,j'}}.$$

The sink module is used for making a routing decision according to probability vectors $P_t^i=[p_t^{i,0}, p_t^{i,1}, \ldots, p_t^{i,A}]$, i=1, 2, . . . , A uploaded to the sink module by A decision networks as follows: firstly, generating a spanning tree of the wireless sensor network at time t according to probability vectors $P_t^i=[p_t^{i,0}, p_t^{i,1}, \ldots, p_t^{i,A}]$, i=1, 2, . . . , A, then taking sink node $n^0$ as a root node to recalculate a routing for each sensor node according to the spanning tree.

A multi-agent deep reinforcement learning algorithm is adopted in the present invention, and the modeling of deep reinforcement learning is needed to be in accordance with Markov decision processes. However, after taking the routing decision of a wireless sensor network as a continuous decision and modeling it as a Markov decision processes, a test shows that if the routing policy of the wireless sensor network are obtained through the distributed samplings of A decision networks, heavy routing loops may exist in the obtained routing policy, which leads to unaffordable energy consumption. Therefore, the present invention can totally avoid routing loops through centralized routing-decision of the sink node, thus the routing performance is enhanced.

Figure 5:
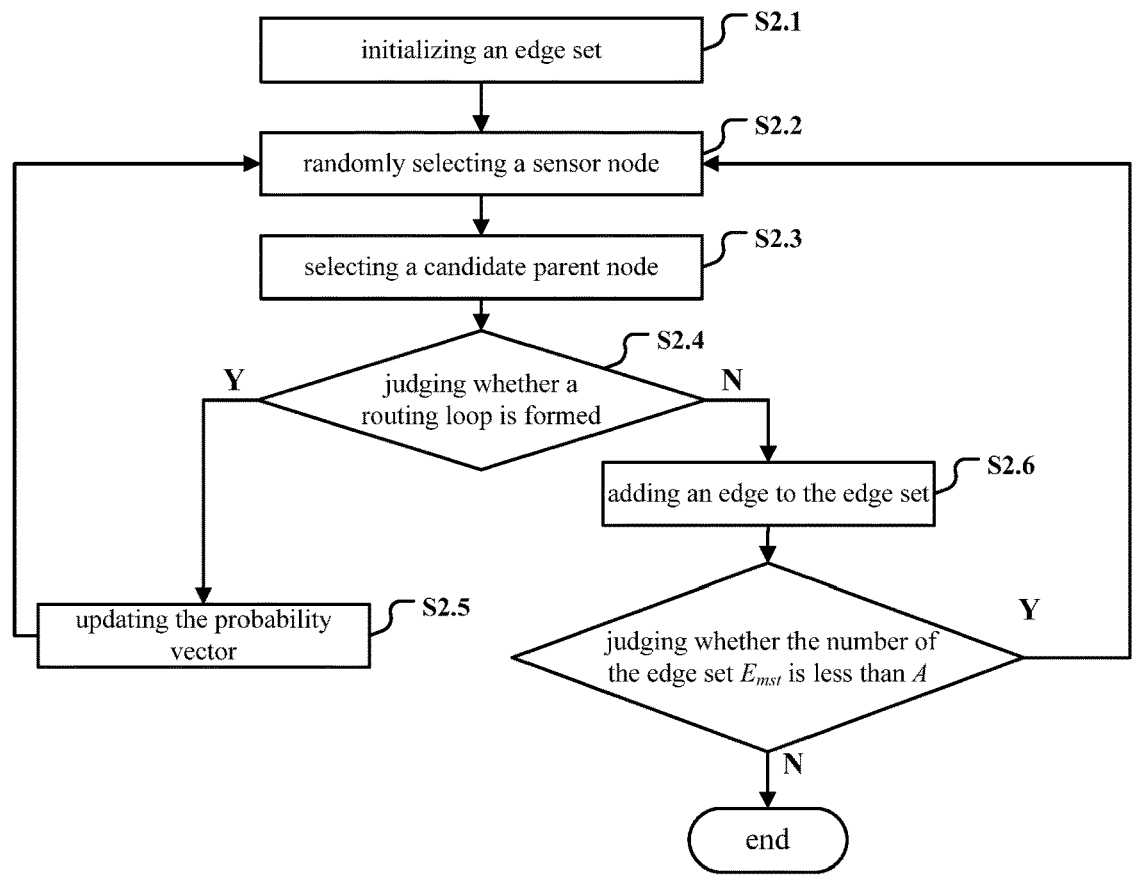
FIG. 5 is a flow diagram of generating a spanning tree according to probability vectors in accordance with the present invention.

The method for generating a spanning tree of the wireless sensor node at time t according to the probability vectors can be chosen on the basis of the actual embodiment. FIG. 5 is a flow diagram of generating a spanning tree according probability vectors in accordance with the present invention. As shown in FIG. 5, the steps in details of generating a spanning tree according to the probability vectors are as follows:

Step S2.1: Initializing an Edge Set

Setting an edge set $E_{mst}$ by sink node $n^0$ and initializing it to an empty set, where edge set $E_{mst}$ is used for storing the edges of the spanning tree generated for the wireless sensor network.

Step S2.2: Randomly Selecting a Sensor Node

Randomly selecting an unsampled sensor node $n^{i*}$.

Step S2.3: Selecting a Candidate Parent Node

Randomly generating a floating point number in the range of (0,1] by sink node $n^0$, and judging the interval it fall within on the cumulative distribution function of probability vector $P_t^{i*}=[p_t^{i*,0}, p_t^{i*,1}, \ldots, p_t^{i*,A}]$ of unsampled sensor node $n^{i*}$, taking the node corresponding to the probability which corresponds to the interval as the candidate parent node $n^{j*}$ of the unsampled sensor node $n^{i*}$.

Supposing the sensor node selected by sink node $n^0$ is sensor node $n^3$ at current routing decision, its probability vector is $P_i^3$=[0.5, 0, 0, 0, 0, 0, 0.1, 0.1, 0, 0, 0.1, 0, 0,0, 0, 0.1, 0, 0, 0, 0.1], the cumulative distribution function of $P_t^3$ is [0.5, 0.5, 0.5, 0.5, 0.5, 0.5, 0.6, 0.7, 0.7, 0.7, 0.8, 0.8, 0.8, 0.8, 0.8, 0.9, 0.9, 0.9, 0.9, 1], supposing the floating point number is 0.83, which falls within the interval of the $10^{th}$-$14^{th}$ element of the cumulative distribution function, then sensor node $n^{10}$ is selected as the parent node of sensor node $n^3$.

Step S2.4: Judging Whether a Routing Loop is Formed judging whether a routing loop is formed after the edge $(n^{i*},n^{j*})$ is added into edge set $E_{mst}$, if yes, then going to step S2.5, otherwise going to step S2.6.

Step S2.5: Updating the Probability Vector

Renormalizing probability vector $P_t^{i*}=[p_t^{i*,0}, p_t^{i*,1}, \ldots, p_t^{i*,A}]$ of sensor node $n^{i*}$ as follows:

$$p_t^{i*,j} = \frac{p_t^{i*,j}}{1 - p_t^{i*,j*}}.$$

Then letting $p_t^{i*,j*}=0$ to obtain an updated probability vector and returning to step S2.2.

For example, the sensor node $n^{10}$ is selected as the parent node of sensor node $n^3$, the corresponding edge is added into the edge set $E_{mst}$, and a routing loop is formed. For $p_t^{3,10}$=0.1, the updated probability vector $P^3$=[0.56, 0, 0, 0, 0, 0, 0.11, 0.11, 0, 0, 0, 0, 0, 0, 0, 0.11, 0, 0, 0, 0.11].

Step S2.6: Adding an Edge to the Edge Set

Adding the edge $(n^{i*},n^{j*})$ to edge set $E_{mst}$ and marking sensor node $n^{i*}$ as sampled.

Step S2.7: judging whether the number of edge set $E_{mst}$ is less than A, if yes, returning to step S2.2, otherwise the spanning tree is generated.

Step S3: Training the Decision Networks

Training the decision networks of A agents $a^i$, l=1, 2, . . . , A of the cooperative routing decision system by a multi-agent deep reinforcement learning algorithm.

For the decision network of an agent, the problem to be solved is an online problem, the routing decisions are interrelated and the decision space is very large due to the specialty of the problem, so it is very difficult to obtain an optimal solution. Therefore, a mean field actor critic frame of an actor-critic algorithm based multi-agent deep reinforcement learning algorithm is chosen in the embodiment and the training of the decision networks are performed through a simulation. The steps in details are as follows:

In a simulation environment, simulating the amount of the data collected by each sensor node in a real world according to the corresponding designed probability distribution based on existing prior knowledge for different type of data collected by the sensor node. In the embodiment, letting the data amount uniformly distributed in the range of [500 bytes, 1000 bytes].

The decision network of each agent in the cooperative routing decision system created in step S2 is taken as an actor network, a critic network is set for instructing the learning of the actor network. Extra global information can be obtained by the critic network, which can guarantee feasibility and stability of training. The process of routing decision of the decision network in present invention is modeled as a partially observable Markov decision process, where the input vector of each decision network is taken as a local observation in the partially observable Markov decision process, the parent node chosen by the routing of corresponding sensor node which is obtained by the sink node is taken as an action in the partially observable Markov decision process, the reward function is calculated according to the lifetime of the wireless sensor network, the calculating formula is:

$$R_t = \begin{cases} 0, & \text{the wireless sensor network is still running at time } t \\ T, & \text{the wireless sensor network is paralyzed at time } t \end{cases}$$

where $R_t$ is the value of the reward function at time t, T is the lifetime of the wireless sensor network. In other words, after each sensor complete its data transmission according to corresponding routing of its action, if the wireless sensor network is still running, the value of the reward function is 0, if the energy of any sensor node is run out, the wireless sensor network is paralyzed, the value of the reward function is the lifetime of the wireless sensor network.

At last, simulating the wireless sensor network through a simulator and training the actor-critic network by sampling the data which is obtained by the simulation, so as the training of the decision networks are realized.

In the embodiment, setting the decision networks of all agents sharing parameters to enhance the training efficiencies of them.

Figure 6:
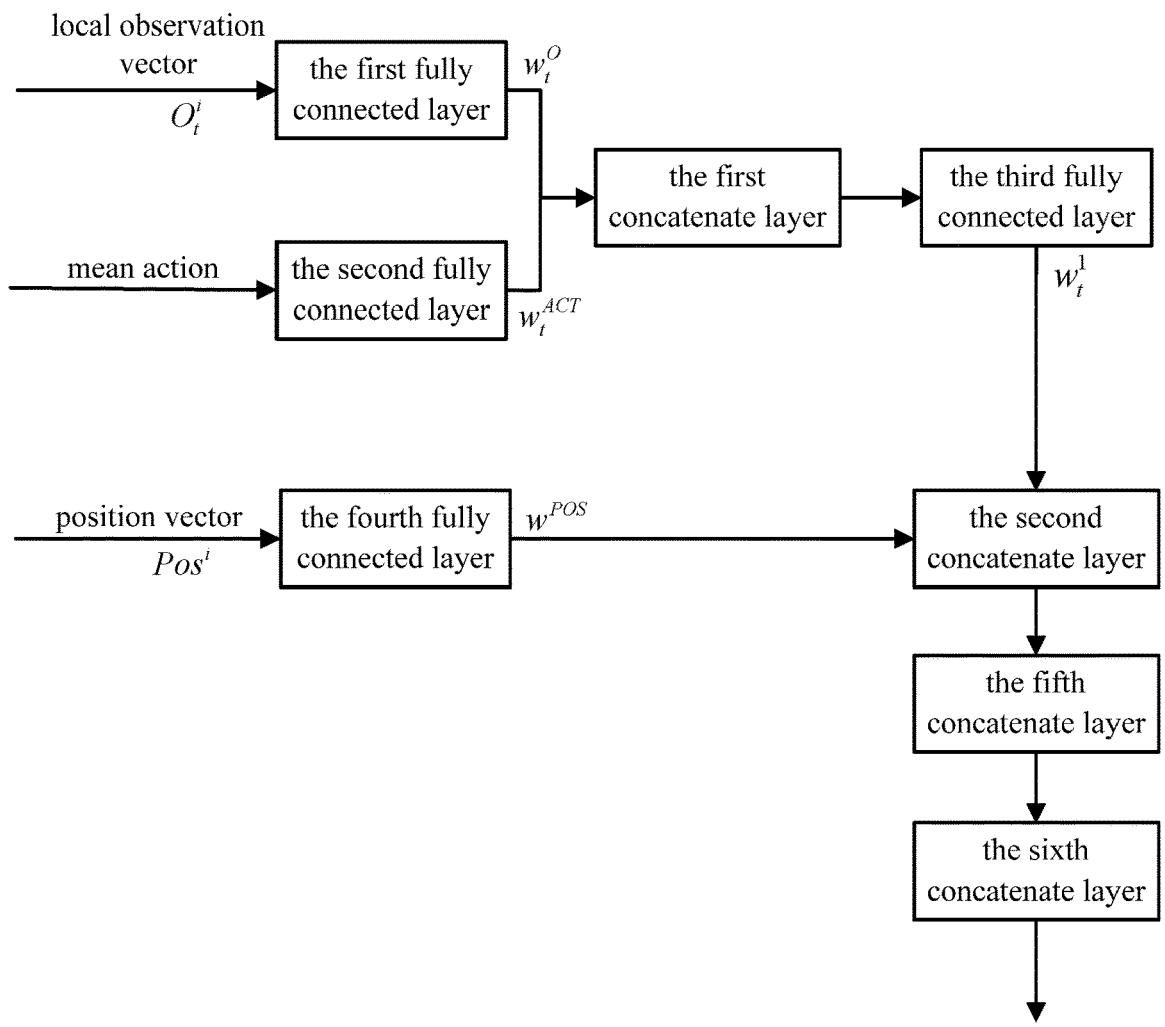
FIG. 6 is a diagram of an actor-critic network in accordance with the present invention.

In the embodiment, the neural network as shown in FIG. 4 and a correction module are used to build a decision network as the actor network. FIG. 6 is a diagram of an actor-critic network in accordance with the present invention. In the embodiment, the critic network comprises the first fully connected layer, the second fully connected layer, the first concatenate layer, the third fully connected layer, the fourth fully connected network, the second concatenate layer, the fifth fully connected layer and the sixth fully connected layer, where:

The first fully connected layer is used for receiving and processing local observation vector $O_t^i$ and sending obtained feature $w_t^O$ to the second fully connected layer.

The second fully connected layer is used for receiving the mean action of all neighbor nodes of sensor node $n^i$ at the previous routing decision, the method for determining the mean action is: doing one-hot encoding for the action of each neighbor node and averaging the corresponding encoded vectors to obtain a mean action. The mean action is processed by the second fully connected layer to obtain a feature $w_t^{ACT}$, which is inputted into the first concatenate layer.

The first concatenate layer is used for concatenating the two received features $w_t^O$ and $w_t^{ACT}$ together. Then the feature obtained by concatenating is sent to the third fully connected layer.

The third fully connected layer is used for processing the feature obtained by concatenating to obtain a feature $w_t^1$. Then feature $w_t^1$ is sent to the second concatenate layer.

The fourth fully connected layer is used for receiving position vector $Pos^i$ and processing it to obtain a feature $w^{POS}$. Feature $w^{POS}$ is sent to the second concatenate layer.

The second concatenate layer is used for concatenating the two features $w_t^1$ and $w^{POS}$ together, the feature obtained by concatenating is sent to the fifth fully connected layer.

The fifth fully connected layer is used for processing the received feature to obtain a feature $w_t$, feature $w_t$ is sent to the sixth fully connected layer;

The sixth fully connected layer is used for processing the received feature $w_t$ to obtain a final evaluation value.

In the embodiment, the first to the fifth fully connected layers of the critic network adopt ReLU (Rectified Liner Unit) activation functions, and the sixth fully connected layer adopts a linear activation function.

In the embodiment, RMSProp (Root Mean Squared Propagation) optimizers are used in the trainings of the actor network and the critic network, the learning rate of the actor network is $1\times10^{-5}$, the learning rate of the critic network is $5\times10^{-5}$. In the embodiment, a target critic network is introduced to ensure the stability of training, and the parameters of the target critic network are updated in combination with the parameters of the critic network by using a soft-update policy. The parameter of the soft update is $1\times10^{-3}$. To ensure the exploration intensity of the actor network and avoid falling into local optimal solution early, a extra entropy regularization term is added into the loss function, the weight of the extra entropy regularization term is set to $1\times10^{-6}$.

Step S4: Deploying the Wireless Sensor Node

Figure 7:
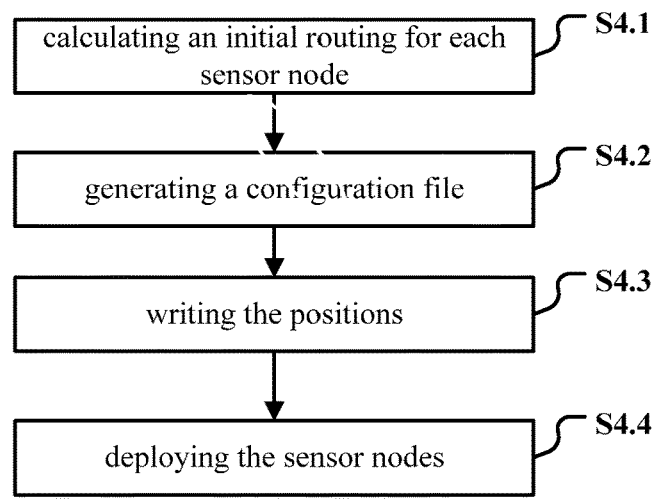
FIG. 7 is a flow diagram of deploying a wireless sensor network in accordance with the present invention.

The next work is to deploy the wireless sensor node. FIG. 7 is a flow diagram of deploying a wireless sensor network in accordance with the present invention. As shown in FIG. 7, the deployment of the wireless sensor network in the present invention comprises the following detailed steps:

Step S4.1: Calculating an Initial Routing for Each Sensor Node

Firstly, calculating a minimum spanning tree according to the positions and the neighborhoods of sensor nodes $n^i$, $i=1, 2, \ldots, A$ of the wireless sensor network to be deployed by taking the distances between nodes as weights. In the embodiment, a kruskal algorithm is used for calculating a minimum spanning tree. Then, taking sink node $n^0$ in the minimum spanning tree as a root node and calculating an initial routing for each sensor node. In the embodiment, the initial routing for each sensor node is calculated by a BFS (Breadth First Search) algorithm.

Step S4.2: Generating a Configuration File

For each sensor node, loading the information of its neighborhood and initial routing into its configuration file according to its position.

Step S4.3: Loading the Positions

Loading the positions of the sensor nodes into the sink node.

Step S4.4: Deploying the Sensor Nodes

Deploying sensor nodes $n^i$, $i=1, 2, \ldots, A$ into an actual environment according to their respective positions.

Step S5: Initializing the Sensor Nodes

When the wireless sensor network is started, setting up two counters in each sensor node $n^i$ and initializing the two counters to 0, wherein the two counters are used for counting the amount $cnt_s^i$ of the collected environmental data and the amount $cnt_o^i$ of the forwarded data at each decision, initializing a transmission count m in each sensor node to 1.

Step S6: Monitoring the Collected Environmental Data

For each sensor node, collecting environmental data from environment continuously and receiving the environmental data sent by other sensor nodes, sending the environmental data collected in current transmission cycle and forwarding the environmental data coming from other sensor nodes to the sink node according to current routing at each transmission interval of U seconds, where the amount of the environmental data collected by sensor node $n^i$ and sent to the parent node of sensor node $n^i$ at the $m^{th}$ transmission circle is denoted by $d_s^{i,m}$, the amount of the environmental data coming from other sensor nodes and forwarded by the sensor node $n^i$ at the $m^{th}$ transmission circle is denoted by $d_o^{i,m}$, then amount $cnt_s^i$ of the collected environmental data is $cnt_s^i = cnt_s^i + d_s^{i,m}$ and amount $cnt_o^i$ of the forwarded data is $cnt_o^i = cnt_o^i + d_o^{i,m}$;

Step S7: Judging Whether a Sensor Node is Below a Set Threshold obtaining the residual energies of the sensor nodes and judging whether one of them is below a pre-defined threshold, if yes, then judging that the wireless sensor network is paralyzed and terminating the routing process, otherwise going to step S8.

Step S8: judging whether m % M=0, where M is a routing decision cycle, which is denoted by the number of transmission cycles, % is a remainder operator, if yes, then going to step S9, otherwise returning to step S6.

Step S9: Updating the Routing Policy of the Wireless Sensor Network

Figure 8:
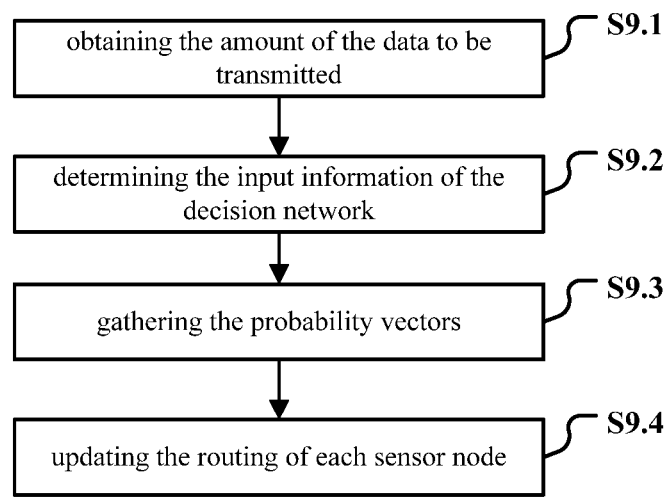
FIG. 8 is a flow diagram of updating routing policy in accordance with the present invention.

Updating the routing policy of the wireless sensor network through a cooperative routing decision of A agents $a^i$, i=1, 2, ..., A. FIG. 8 is a flow diagram of updating routing policy in accordance with the present invention. As shown in FIG. 8, in the present invention, the update of the routing policy of the wireless sensor network comprises the following steps:

Step S9.1: Obtaining the Amount of the Data to be Transmitted

Obtaining amount $cnt_s^i$ of the collected environmental data and the amount $cnt_o^i$ of the forwarded data of the corresponding sensor node $n^i$ by agent $a^i$, letting data amount $c_s^{i,t}=cnt_s^i$ and data amount $c_o^{i,t}=cnt_o^i$, then setting amount $cnt_s^i$ of the collected environmental data and amount $cnt_o^i$ of the forwarded data to 0, where i=1, 2, ..., A.

Step S9.2: Determining the Input Information of the Decision Network

Obtaining local observation vector $O_t^i$ and position vector $Pos^i$ of sensor node $n^i$ by agent $a^i$, then concatenating local observation vector $O_t^i$ and position vector $Pos^i$ together to obtain an input vector and inputting the input vector to corresponding decision network to obtain a probability vector $P_t^i=[p_t^{i,0}, p_t^{i,1}, \ldots, p_t^{i,A}]$, where i=1, 2, ..., A.

Step S9.3: Gathering the Probability Vectors

Uploading probability vectors $P_t^i=[p_t^{i,0}, p_t^{i,1}, \ldots, p_t^{i,A}]$, i=1, 2, ..., A to sink node $n^0$ by sensors nodes $n^i$ through their corresponding current routings, respectively.

Step S9.4: Updating the Routing of Each Sensor Node

Recalculating a routing for each sensor node by sink node $n^0$ according to the received probability vectors $P_t^i=[p_t^{i,0}, p_t^{i,1}, \ldots, p_t^{i,A}]$, i=1, 2, ..., A and sending the routings to corresponding sensor nodes, respectively, then returning to step S6.

Figure 9:
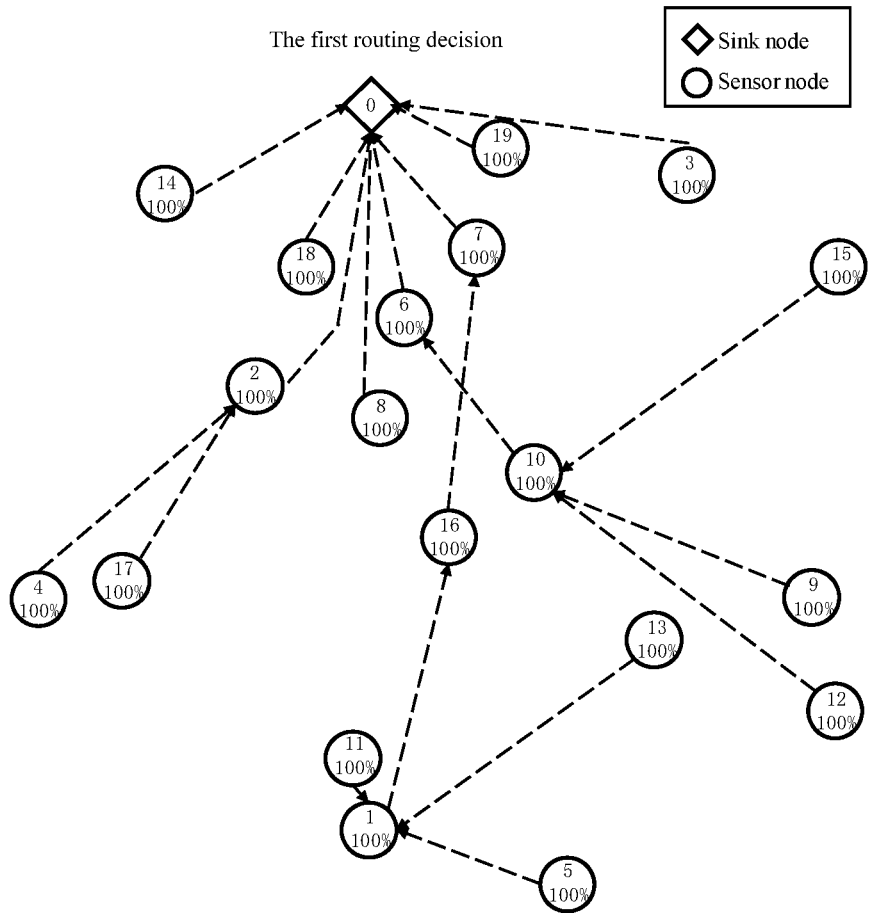
FIG. 9 is a diagram of a routing policy at the first routing decision in accordance with one embodiment of the present invention.
Figure 10:
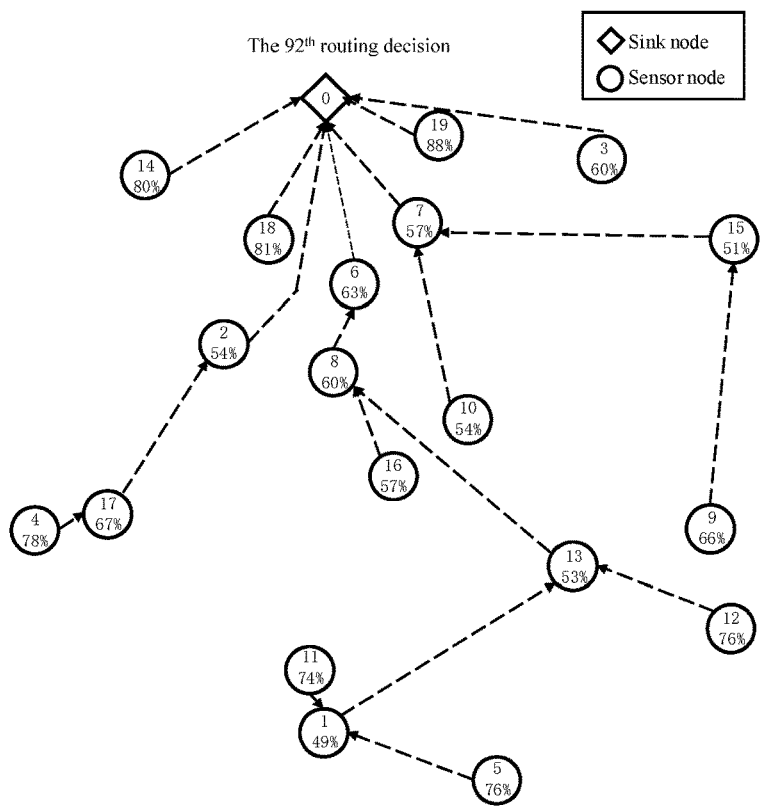
FIG. 10 is a diagram of a routing policy at the $92^{th}$ routing decision in accordance with one embodiment of the present invention.
Figure 11:
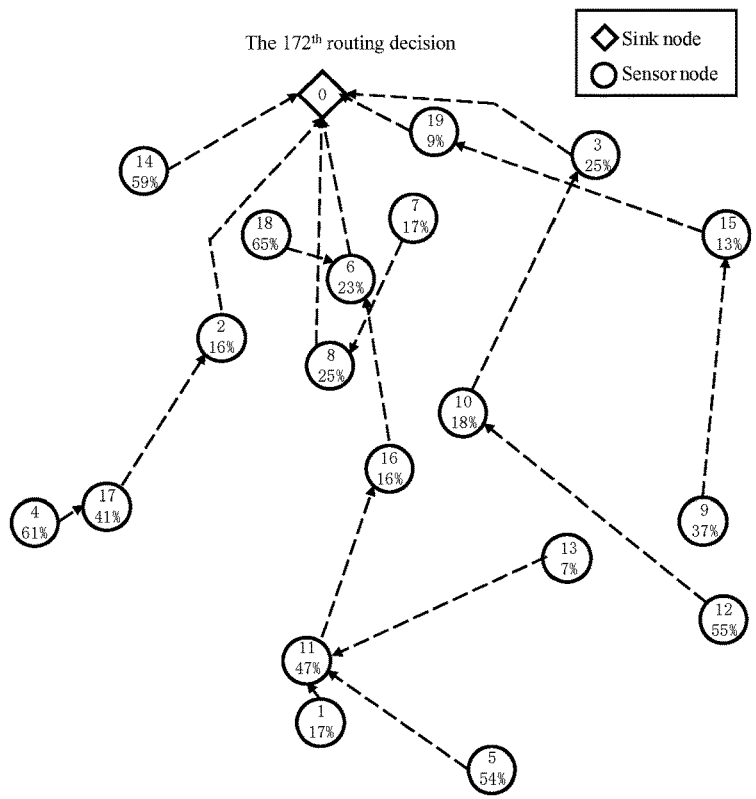
FIG. 11 is a diagram of a routing policy at the $176^{th}$ routing decision in accordance with one embodiment of the present invention.

In the embodiment, the update cycle M of routing is set to 10, in other words, the routing policy of the wireless sensor network is updated at the interval of 10 transmission cycles. FIG. 9 is a flow diagram of updating routing policy in accordance with the present invention. FIG. 10 is a diagram of a routing policy at the first routing decision in accordance with one embodiment of the present invention. FIG. 11 is a diagram of a routing policy at the 92$^{th}$ routing decision in accordance with one embodiment of the present invention. It can be seen from FIG. 9 to FIG. 11 that the routing policy provided by the present invention has considered both of hops and residual energies (denoted by percentage in the figures), so the lifetime of the wireless sensor network is enhanced significantly.

In order to illustrate the technical effect, a specific example are given to verify the present invention through an experiment, and the wireless sensor network shown in FIG. 2 is adopted in the experiment. At the same time, three routing methods are chosen for comparison. Comparison method 1 uses a classic minimum spanning tree (MST) algorithm in which the distance between nodes is set as a weight of an edge. Comparison method 2 is the method published by the document of "Perkins C, Belding-Royer E, Das S. RFC3561: Ad hoc on-demand distance vector (AODV) routing [J]. 2003" (AODV for short). Comparison method 3 is the method published by the document of "Shah R C, Rabaey J M. Energy aware routing for low energy ad hoc sensor networks[C]//2002 IEEE Wireless Communications and Networking Conference Record. WCNC 2002 (Cat. No. 02TH8609). IEEE, 2002, 1: 350-355" (EAR for short). Comparing the lifetimes of the wireless sensor network in the present invention and the three comparisons, the comparison results are shown in Table 1.

TABLE 1

| Routing method | MST | AODV | EAR | The present invention |
|---|---|---|---|---|
| the lifetime of the wireless sensor network | 808 | 1049 | 1391 | 1776 |

As shown in Table 1, the present invention can make the lifetime of the wireless sensor network more longer, its lifetime is twice the length of that of MST, which verified the feasibility of the present invention.

While illustrative embodiments of the invention have been described above, it is, of course, understand that various modifications will be apparent to those of ordinary skill in the art. Such modifications are within the spirit and scope of the invention, which is limited and defined only by the appended claims.

What is claimed is:

1. A method for energy efficient routing in wireless sensor network based on multi-agent deep reinforcement learning, comprising:

step S1: for a wireless sensor network to be deployed, denoting the sink node which is connected to power supplies and has unlimited energy by $n^0$ and the sensor nodes which are battery-powered by $n^i$, i=1, 2, ..., A, where A is the number of the battery-powered sensor nodes; and for sensor node $n^i$, taking the other nodes within its communication range as its neighbor node set $N_{nbr}^i$;

setting the transmission cycle of each sensor node as U seconds, wherein each sensor node collects environmental data T seconds from its environment in each transmission cycle and sends the collected environmental data to sink node $n^0$;

deploying an agent on each sensor node, wherein for sensor node $n^i$, its agent is denoted by $a^i$;

step S2: constructing a cooperative routing decision system, which comprises A decision networks and one sink module, where A decision networks are deployed on agents $a^i$, i=1, 2, ..., A, of sensor nodes $n^i$, i=1, 2, ..., A, respectively, and the sink module is deployed on sink node $n^0$, wherein:

the decision network deployed on agent $a^i$ of sensor node $n^i$ is used for determining a probability vector $P_t^i=[p_t^{i,0}, p_t^{i,1}, \ldots, p_t^{i,A}]$ of choosing sink node $n^0$ and sensor nodes $n^i$, i=1, 2, ..., A as its parent nodes at time t, where $p_t^{i,j}$ is a probability of choosing node $n^j$ as the parent node of sensor node $n^i$ at time t, j=0, 1, ..., A, t is a routing decision time, probability vector $P_t^i=[p_t^{i,0}, p_t^{i,1}, \ldots, p_t^{i,A}]$ is uploaded to the sink module on sink node $n^0$ through the current routing;

the decision network comprises a neural network and a mask module, where the input of the neural network is an input vector which is obtained by concatenating a local observation vector $O_t^i$ and a position vector $Pos^i$, the output of the neural network is denoted by a raw probability vector $\hat{P}_t^i=[\hat{p}_t^{i,0}, \hat{p}_t^{i,1}, \ldots, \hat{p}_t^{i,A}]$ and sent to the mask module, $\hat{p}_t^{i,j}$ is a raw probability of choosing node $n^j$ as the parent node of sensor node $n^i$ at time t, where:

local observation vector $O_t^i$ is determined as follows: firstly, obtaining data amounts $c_s^{i,t-b_1+1}$, $b_1=1, 2, \ldots, B_1$ of the environmental data collected by sensor node $n^i$ at previous $B_1$ routing decision times, obtaining data amounts $c_o^{i,t-b_2+1}$, $b_2=1, 2, \ldots, B_2$ of the data forwarded by sensor node $n^i$ as a relay node at previous $B_2$ routing decision times and obtaining residual energy $W^{i,t}$ of sensor node $n^i$ at time t, then normalizing data amount $c_s^{i,t-b_1+1}$, data amount $c_o^{i,t-b_2+1}$ and residual energy $W^{i,t}$ according to their respective theoretical maximum to obtain a normalized data amount $\bar{c}_s^{i,t-b_1+1}$, a normalized data amount $\bar{c}_o^{i,t-b_2+1}$ and a normalized residual energy $\overline{W}^{i,t}$:

$$\bar{c}_s^{i,t-b_1+1} = \frac{2c_s^{i,t-b_1+1}}{\hat{c}_s^i} - 1, b_1 = 1, 2, \ldots, B_1$$

$$\bar{c}_o^{i,t-b_2+1} = \frac{2c_o^{i,t-b_2+1}}{\hat{c}_o^i} - 1, b_2 = 1, 2, \ldots, B_2$$

$$\overline{W}^{i,t} = \frac{2W^{i,t}}{\hat{W}^i} - 1$$

where $\hat{c}_s^i$, $\hat{c}_o^i$ and $\hat{W}^i$ are the theoretical maximums of data amount $c_s^{i,t-b_1+1}$ data amount $c_o^{i,t-b_2+1}$ and residual energy $W^{i,t}$, respectively;
then concatenating normalized data amount $\bar{c}_s^{i,t-b_1+1}$, normalized data amount $\bar{c}_o^{i,t-b_2+1}$ and normalized residual energy $\overline{W}^{i,t}$ to obtain a local observation vector $O_t^i$:

$$O^i = [\bar{c}_s^{i,t-B_1+1}, \ldots, \bar{c}_s^{i,t}, \bar{c}_o^{i,t-B_2+1}, \ldots, \bar{c}_o^{i,t}, \overline{W}^{i,t}]$$

position vector Pos$^i$ is determined as follows: establishing a Cartesian coordinate system with sink node $n^0$ as an origin and obtaining coordinates $(pos_1^i, pos_2^i)$ of sensor node $n^i$ under the Cartesian coordinate system, where $pos_1^i$ and $pos_2^i$ are the horizontal coordinate and the vertical coordinate of sensor node $n^i$, respectively, then obtaining a distance dis$^i$ between sensor node $n^i$ and sink node $n^0$ and a maximal distance max_dis among the A distances dis$^i$, i=1, 2, ..., A, then normalizing coordinates $(pos_1^i, pos_2^i)$ to obtain position vector Pos$^i$:

Pos$^i$=(pos$_1^i$/max_dis,pos$_2^i$/max_dis)

the mask module is used for correcting raw probability vector $\hat{P}_t^i=[\hat{p}_t^{i,0}, \hat{p}_t^{i,1}, \ldots, \hat{p}_t^{i,A}]$ according to neighbor node set $N_{nbr}^i$ of sensor node $n^i$ to obtain probability vector $P_t^i=[p_t^{i,0}, p_t^{i,1}, \ldots, p_t^{i,A}]$ as follows: for each probability $\hat{p}_t^{i,j}$ in raw probability vector $\hat{P}_t^i=[\hat{p}_t^{i,0}, \hat{p}_t^{i,1}, \ldots, \hat{p}_t^{i,A}]$, firstly, if the corresponding node $n^j$ is not in neighbor node set $N_{nbr}^i$ of sensor node $n^i$, setting probability $\hat{p}_t^{i,j}$ to 0, otherwise, not changing probability $\hat{p}_t^{i,j}$, then normalizing probability $\hat{p}_t^{i,j}$ to obtain probability $p_t^{i,j}$:

$$p_t^{i,j} = \frac{\hat{p}_t^{i,j}}{\sum_{j'=0}^{A} \hat{p}_t^{i,j'}}$$

the sink module is used for making a routing decision according to probability vectors $P_t^i=[p_t^{i,0}, p_t^{i,1}, \ldots, p_t^{i,A}]$, i=1, 2, ..., A uploaded to the sink module by A decision networks as follows: firstly, generating a spanning tree of the wireless sensor network at time t according to probability vectors $P_t^i=[p_t^{i,0}, p_t^{i,1}, \ldots, p_t^{i,A}]$, i=1, 2, ..., A, then taking sink node $n^0$ as a root node to recalculate a routing for each sensor node according to the spanning tree;

step S3: training the decision networks of A agents $a^i$, l=1, 2, ..., A of the cooperative routing decision system by a multi-agent deep reinforcement learning algorithm;

step S4: deploying the wireless sensor network, which comprises the following steps:

step S4.1: firstly, calculating a minimum spanning tree according to the positions and the neighborhoods of sensor nodes i=1, 2, ..., A of the wireless sensor network to be deployed by taking the distances between nodes as weights, then, taking sink node $n^0$ in the minimum spanning tree as a root node and calculating an initial routing for each sensor node;

step S4.2: for each sensor node, loading the information of its neighborhood and initial routing into its configuration file according to its position;

step S4.3: loading the positions of sensor nodes $n^i$, i=1, 2, ..., A into sink node $n^0$;

step S4.4: deploying sensor nodes $n^i$, i=1, 2, ..., A into an actual environment according to their respective positions;

step S5: when the wireless sensor network is started, setting up two counters in each sensor node $n^i$ and initializing the two counters to 0, wherein the two counters are used for counting the amount $cnt_s^i$ of the collected environmental data and the amount $cnt_o^i$ of the forwarded data at each decision, initializing a transmission count m in each sensor node to 1;

step S6: for each sensor node, collecting environmental data from environment continuously and receiving the environmental data sent by other sensor nodes, sending the environmental data collected in current transmission cycle and forwarding the environmental data coming from other sensor nodes to the sink node according to current routing at each transmission interval of U seconds, where the amount of the environmental data collected by sensor node and sent to the parent node of sensor node $n^i$ at the $m^{th}$ transmission circle is denoted by $d_s^{i,m}$, the amount of the environmental data coming from other sensor nodes and forwarded by the sensor node $n^i$ at the $m^{th}$ transmission circle is denoted by $d_o^{i,m}$, then amount $cnt_s^i$ of the collected environmental data is $cnt_s^i=cnt_s^i+d_s^{i,m}$ and amount $cnt_o^i$ of the forwarded data is $cnt_o^i=cnt_o^i+d_o^{i,m}$;

step S7: obtaining the residual energies of the sensor nodes and judging whether one of them is below a pre-defined threshold, if yes, then judging that the wireless sensor network is paralyzed and terminating the routing process, otherwise going to step S8;

step S8: judging whether m % M=0, where M is a routing decision cycle, which is denoted by the number of transmission cycles, % is a remainder operator, if yes, then going to step S9, otherwise returning to step S6;

step S9: updating the routing policy of the wireless sensor network through a cooperative routing decision of A agents $a^i$, l=1, 2, ..., A, which comprises the following steps:

step S9.1: obtaining amount $cnt_s^i$ of the collected environmental data and the amount $cnt_o^i$ of the forwarded data of the corresponding sensor node $n^i$ by agent $a^i$, letting data amount $c_s^{i,t}=cnt_s^i$ and data amount $c_o^{i,t}=cnt_o^i$, then setting amount $cnt_s^i$ of the collected environmental data and amount $cnt_o^i$ of the forwarded data to 0, where l=1, 2, ..., A;

step S9.2: obtaining local observation vector $O_t^i$ and position vector Pos$^i$ of sensor node $n^i$ by agent $a^i$, then concatenating local observation vector $O_t^i$ and position vector Pos$^i$ together to obtain an input vector and inputting the input vector to corresponding decision network to obtain a probability vector $P_t^i=[p_t^{i,0}, p_t^{i,1}, \ldots, p_t^{i,A}]$, where $i=1, 2, \ldots, A$;

step S9.3: uploading probability vectors $P_t^i=[p_t^{i,0}, p_t^{i,1}, \ldots, p_t^{i,A}]$, $i=1, 2, \ldots, A$ to sink node $n^0$ by sensors nodes $n^i$ through their corresponding current routings, respectively;

step S9.4 recalculating a routing for each sensor node by sink node $n^0$ according to the received probability vectors $P_t^i=[p_t^{i,0}, p_t^{i,1}, \ldots, p_t^{i,A}]$, $i=1, 2, \ldots, A$ and sending the routings to corresponding sensor nodes, respectively, then returning to step S6.

2. A method for energy efficient routing in wireless sensor network based on multi-agent deep reinforcement learning of claim 1, wherein the neural network in step S2 comprises first fully connected layer, second fully connected layer, third fully connected lay, a concatenate layer, fourth fully connected layer and a softmax layer, where:

the first fully connected layer is used for receiving and processing local observation vector $O_t^i$ and sending the obtained feature to the second fully connected layer;

the second fully connected layer is used for processing the received feature and sending its obtained feature to the concatenate layer;

the third fully connected layer is used for receiving and processing position vector $Pos^i$ and sending the obtained feature to the concatenate layer;

the concatenate layer is used for concatenating the two obtained features and send the concatenated feature to the fourth fully connected layer;

the fourth fully connected layer is used for receiving and processing the concatenated feature and sending its obtained feature to the softmax layer;

the softmax layer is used for generating raw probability vector $\hat{P}_t^i=[\hat{p}_t^{i,0}, \hat{p}_t^{i,1}, \ldots, \hat{p}_t^{i,A}]$ according to its received feature.

3. A method for energy efficient routing in wireless sensor network based on multi-agent deep reinforcement learning of claim 1, wherein the method for generating a spanning tree of the wireless sensor node at time t according to probability vectors $P_t^i=[p_t^{i,0}, p_t^{i,1}, \ldots, p_t^{i,A}]$, $i=1, 2, \ldots, A$ in step S2 comprises:

step S2.1: initializing an edge set setting an edge set $E_{mst}$ by sink node $n^0$ and initializing it to an empty set, where edge set $E_{mst}$ is used for storing the edges of the spanning tree generated for the wireless sensor network;

step S2.2: randomly selecting a sensor node randomly selecting an unsampled sensor node $n^{i*}$;

step S2.3: selecting a candidate parent node randomly generating a floating point number in the range of $(0,1]$ by sink node $n^0$, and judging the interval it fall within on the cumulative distribution function of probability vector $P_i^{i*}=[p_t^{i*,0}, p_t^{i*,1}, \ldots, p_t^{i*,A}]$ of unsampled sensor node $n^{i*}$, taking the node corresponding to the probability which corresponds to the interval as the candidate parent node $n^{j*}$ of the unsampled sensor node $n^{i*}$;

step S2.4: judging whether a routing loop is formed judging whether a routing loop is formed after the edge $(n^{i*}, n^{j*})$ is added into edge set $E_{mst}$, if yes, then going to step S2.5, otherwise going to step S2.6;

step S2.5: updating the probability vector renormalizing probability vector $P_t^{i*}=[p_t^{i*,0}, p_t^{i*,1}, \ldots, p_t^{i*,A}]$ of sensor node $n^{i*}$ as follows:

$$p_t^{i*,j} = \frac{p_t^{i*,j}}{1-p_t^{i*,j*}}.$$

then letting $p_t^{i*,j*}=0$ to obtain an updated probability vector and returning to step S2.2;

step S2.6: adding an edge to the edge set adding the edge $(n^{i*}, n^{j*})$ to edge set $E_{mst}$ and marking sensor node $n^{i*}$ as sampled;

step S2.7: judging whether the number of edge set $E_{mst}$ is less than A, if yes, returning to step S2.2, otherwise the spanning tree is generated.

4. A method for energy efficient routing in wireless sensor network based on multi-agent deep reinforcement learning of claim 1, wherein a mean field actor critic frame of an actor-critic algorithm based multi-agent deep reinforcement learning algorithm is chosen in the training of the decision network in step S3 and the training of the decision network comprises:

simulating the data amount of the data collected by each sensor node in a real world according to the corresponding designed probability distribution based on existing prior knowledge for different type of data collected by the sensor node;

taking decision networks of the agents in the cooperative routing decision system created in step S2 as an actor network and setting a critic network for instructing the learning of the actor network;

modeling the process of routing decision of the decision network as a partially observable Markov decision process, where the input vector of each decision network is taken as a local observation in the partially observable Markov decision process, the parent node chosen by the routing of corresponding sensor node which is obtained by the sink node is taken as an action in the partially observable Markov decision process, the reward function is calculated according to the lifetime of the wireless sensor network, the calculating formula is:

$$R_t = \begin{cases} 0, & \text{the wireless sensor network is still running at time } t \\ T, & \text{the wireless sensor network is paralyzed at time } t \end{cases}.$$

where $R_t$ is the value of the reward function at time t, T is the lifetime of the wireless sensor network;

at last, simulating the wireless sensor network through a simulator and training the actor-critic network by sampling the data which is obtained by the simulation;

where the critic network comprises first fully connected layer, second fully connected layer, first concatenate layer, third fully connected layer, fourth fully connected network, second concatenate layer, fifth fully connected layer and sixth fully connected layer;

the first fully connected layer is used for receiving and processing local observation vector $O_t^i$ and sending the obtained feature $w_t^O$ to the second fully connected layer;

the second fully connected layer is used for receiving the mean action of all neighbor nodes of the sensor node $n^i$ at the previous routing decision, the method for determining the mean action is: doing one-hot encoding for the action of each neighbor node and averaging the corresponding encoded vectors to obtain the mean action; the mean action is processed by the second fully connected layer to obtain a feature $w_t^{ACT}$ which is inputted into the first concatenate layer;

the first concatenate layer is used for concatenating the two received features $w_t^O$ and $w_t^{ACT}$ together, then the feature obtained by concatenating is sent to the third fully connected layer;

the third fully connected layer is used for processing the feature obtained by concatenating to obtain a feature $w_t^1$, then the feature $w_t^1$ is sent to the second concatenate layer;

the fourth fully connected layer is used for receiving the position vector $Pos^i$ and processing it to obtain a feature $w^{POS}$, the feature $w^{POS}$ is sent to the second concatenate layer;

the second concatenate layer is used for concatenating the two features $w_t^1$ and $w^{POS}$ together, the feature obtained by concatenating is sent to the fifth fully connected layer;

the fifth fully connected layer is used for processing the received feature to obtain a feature $w_t$, the feature $w_t$ is sent to the sixth fully connected layer;

the sixth fully connected layer is used for processing the received feature $w_t$ to obtain a final evaluation value;

the first to the fifth fully connected layers of the critic network adopt ReLU (Rectified Liner Unit) activation functions, and the sixth fully connected layer adopts a linear activation function.

\* \* \* \* \*